June 16, 1925.

W. R. LUTZ

TRAP NEST

Filed Feb. 2, 1925

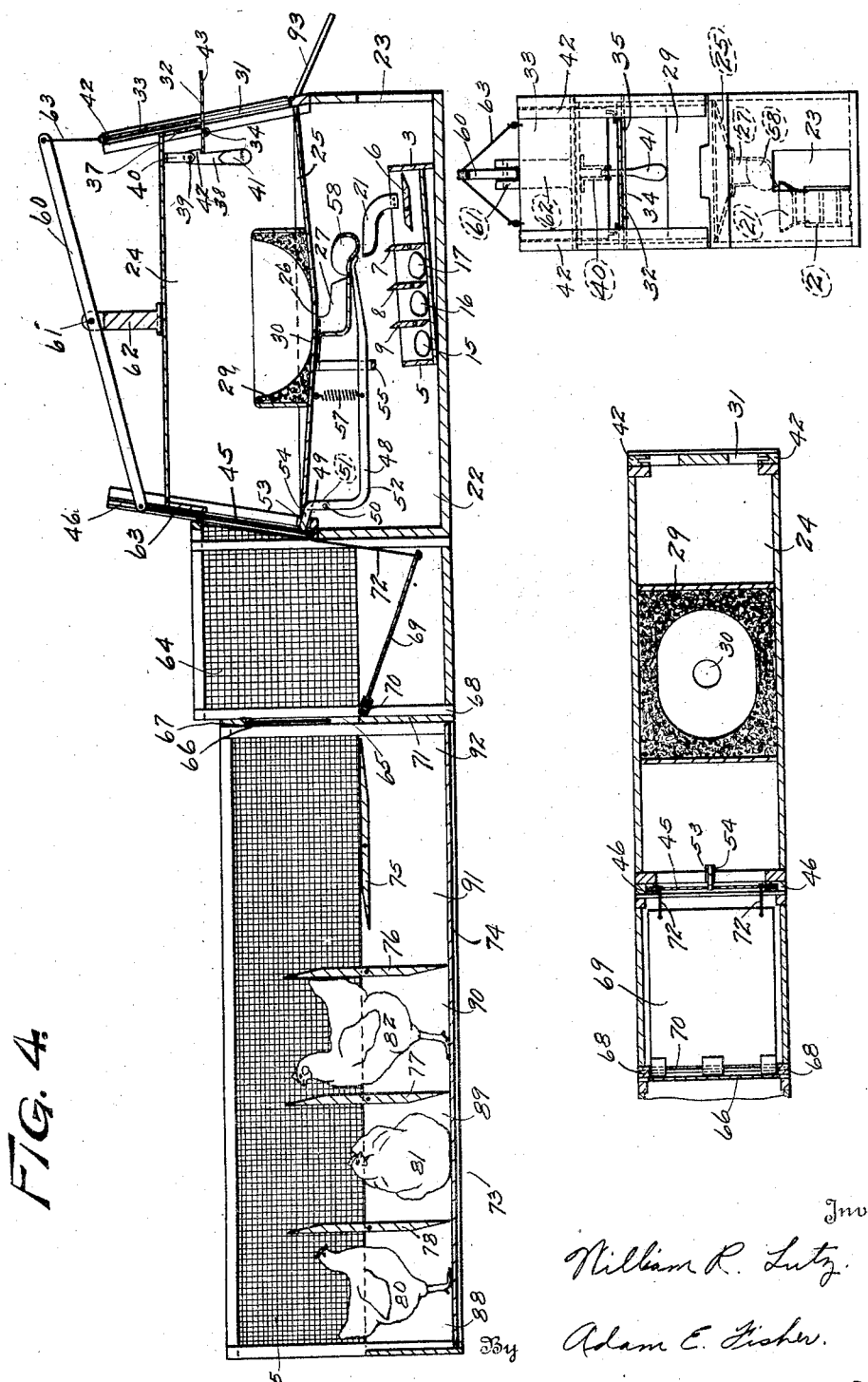

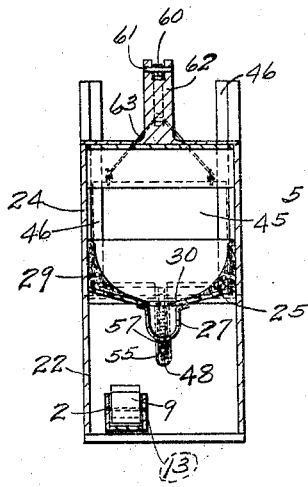
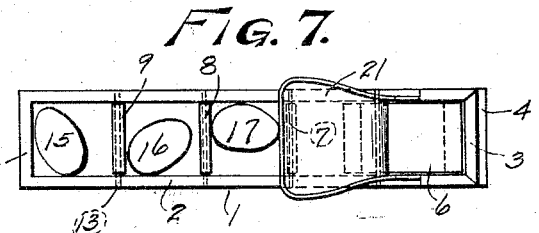
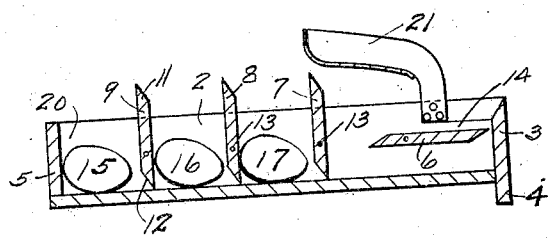
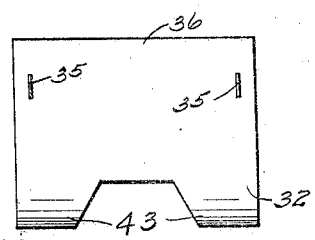
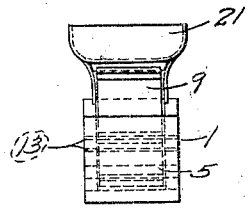

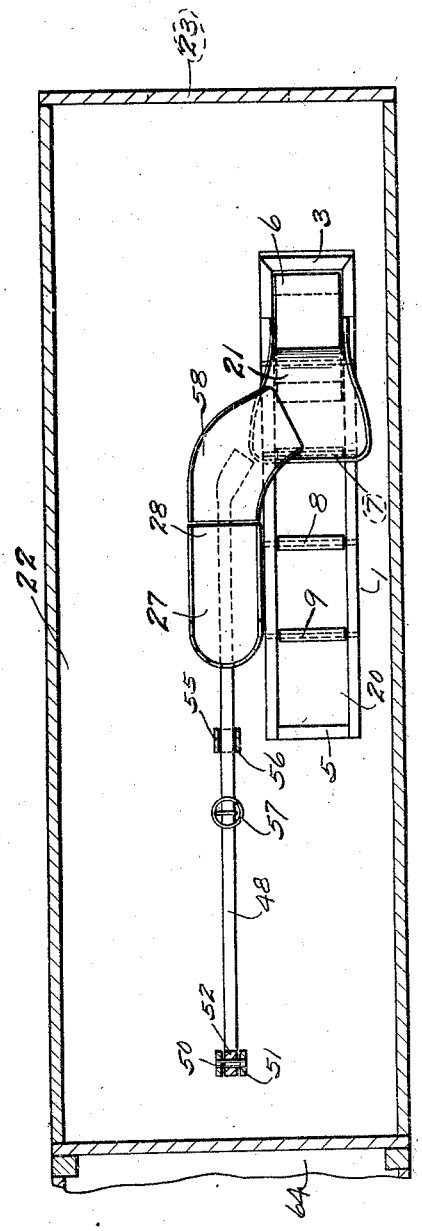
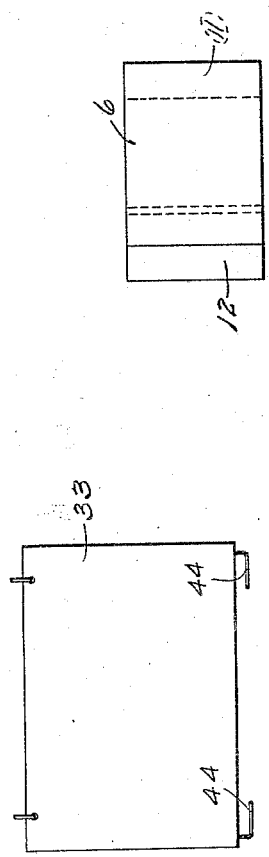

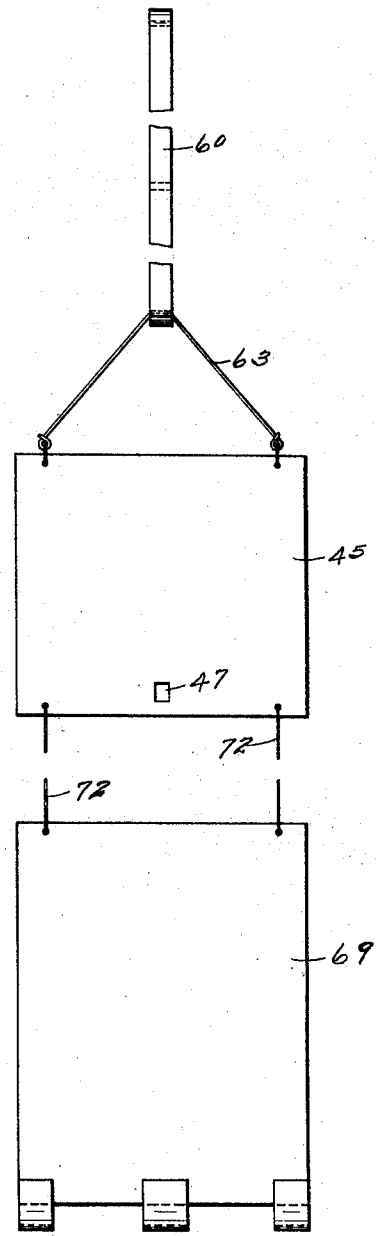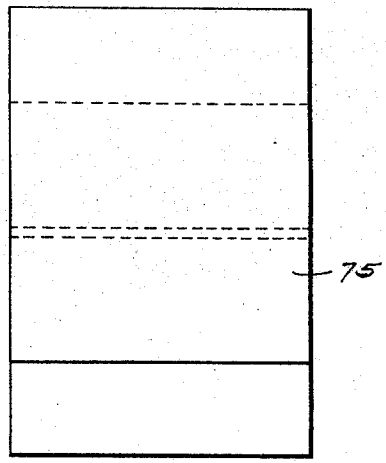

Patented June 16, 1925.

1,541,982

UNITED STATES PATENT OFFICE.

WILLIAM R. LUTZ, OF ST. JAMES, MISSOURI.

TRAP NEST.

Application filed February 2, 1925. Serial No. 6,241.

*To all whom it may concern:*

Be it known that WILLIAM R. LUTZ, a citizen of the United States, residing at St. James, in the county of Phelps and State of Missouri, has invented certain new and useful Improvements in Trap Nests, of which the following is a specification.

This invention is in the way of a trap nest for hens or other fowls, and the main object of the invention is to provide a nest of this type, having means for admitting hens one at a time and releasing them one at a time either through the back door or the front door, depending upon whether the hen has or has not laid an egg, and having means for trapping both the laying hen and the egg laid by her, each in successive order, and so that each egg laid can be checked against and credited to the hen laying it.

Another object is to provide a means for separating laying from non-laying hens.

In the drawings:

Figure 1 is a side elevation of the device, the hen trap boards being shown partly in horizontal position and partly in vertical position;

Figure 2 is a front end view, showing the upper front doors set for the entrance of a hen, and showing one end of the egg trap partly exposed through the lower egg trap door;

Figure 3 is a top or plan view;

Figure 4 is a longitudinal, medial, vertical section, showing several of the hen traps with hens trapped therein;

Figure 5 is a horizontal section taken medially through the forward or nesting portion of the device and on the line 5—5 in Figure 1, immediately above the nest floor;

Figure 6 is a transverse vertical section on the line 6—6 in Figure 1, through the forward portion of the device;

Figure 7 is an enlarged plan view of the egg trap;

Figure 8 is an enlarged longitudinal vertical section through the egg trap, showing several of the egg compartments with eggs deposited therein;

Figure 9 is an enlarged rear end elevation of the egg trap;

Figure 10 is an enlarged horizontal section on the line 10—10 in Figure 1, taken immediately below the nest floor;

Figure 11 is an enlarged detail of the inner or swinging front door;

Figure 12 is an enlarged detail of the outer or sliding front door;

Figure 13 is an enlarged detail of the rear door and operating elements;

Figure 14 is an enlarged detail of one of the egg trap boards;

Figure 15 is an enlarged detail of one of the hen trap boards.

In carrying out this invention, an egg trap 1 is provided, the same comprising an elongated box 2, open at its top and having one end 3 extended downwardly as shown at 4, so as to elevate this end substantially higher than the opposite end 5, so that when eggs are deposited at the end 3 they will roll by gravity to the end 5. Arranged within this box 2 are a plurality of egg trap boards 6, 7, 8, 9, which are beveled off at their opposite ends in opposite directions, as shown at 11 and 12 in Figure 8. These boards are then pivoted medially within the box 2 in a plane extended medially through the sides of the box, being freely mounted by means of pivot pins 13 passed loosely through the sides of the box and through the width of the said boards. These boards when properly mounted will overlie one another at their ends from the end 3 to the end 5 of the box 2, the first board as 6 being overlaid by the second board as 7, and so on to the last board, as 9, and so in combination with the sides of the box forming an egg run-way 14. The end of the first board 6 is set pretty close to the front end 3 of the box 2, being spaced therefrom only sufficient to enable the end of the board to clear the end of the box when tilted vertically. The last board 9, however, is spaced sufficiently from the end 5, to allow the first of the series of eggs, 15—16—17, as it rolls from the end 3 to the end 5 upon the free end of the last board 9, to depress the free end thereof until that board stands in a vertical position and the egg itself falls down to the bottom of the box 2, thus locking the board 9 in its vertical position and forming a sort of trap compartment 20 for the egg 15. Thus as other eggs, as 16 and 17 are deposited upon the run-way 14 at the end 3, they roll one at a time by gravity down along the run-way until each strikes the uptilted trap board, as the board 9' for the egg 16 and the board 8 for the egg 17, whereby it is stopped and its weight causes the end of the board upon which it is then resting to depress, and the egg drops to the bottom of the box 2 in like manner as the egg 15, the respective trap boards 9 and 8 successively uptilting to form compartment traps 20 for the eggs. Thus the operation may be repeated until the entire egg trap is filled with eggs, and it is apparent that while only four egg trap boards are here shown, the trap may be made longer if desired, and additional boards added accordingly. Over the egg trap, near the end 3, is mounted a secondary egg chute 21, the same being faced forwardly or outwardly and so as to cause the egg deposited upon it, in rolling off upon the run-way 14, to strike the forward end of the first trap board 6 whence each egg in succession rolls backwardly down the run-way, until the trap is filled.

The egg trap 1 so formed is loosely set within a lower egg trap box 22 which is provided with a lower front door 23 through which the trap may be inserted or withdrawn, as desired. Upon this casing 22 is mounted a nest box 24, the two being horizontally separated by the floor 25. An egg port 26 is cut in the floor 25, and a primary egg chute 27 is mounted immediately under this hole, the same being secured to the under side of the floor, and is extended and sloped so as to deliver eggs deposited upon it through the hole 26, toward the front of the egg trap box 22. The mouth 28 of the chute 27 is arranged over the secondary chute 21 and is spaced above the same sufficiently to permit a trigger tray to be interposed between the two, as will be later explained. A nest 29 is arranged over the egg port 26, and communicates therewith by means of an aperture 30 formed in the base of the nest, through which aperture the egg, when laid by a hen seated on the nest, rolls down to the chutes.

The front of the nest box 24 is left open to form a door-way 31, and two doors are provided therefor, an inner outwardly swung door 32 and an outer sliding door 33. The inner door 32 is pivotally mounted on a hinge rod 34 which is extended horizontally across the top of the door-way, the door being then loosely secured to this rod by staples 35. The weight of the door 32 normally serves to keep the door hanging down over the door-way 31, which it partly closes. The upwardly extended edge 36 of this door passes up inwardly and back of a frontal plate 37 mounted across the top of the doorway, and serves as a stop to prevent the door from swinging inwardly, while it is free to swing outwardly. The door 32 so mounted and stopped against inward swinging, is brought down sufficiently across the door-way 31 to prevent a hen entering the nest box 24 by attempting to press her way under the door, while a hen on the inside of the box could easily press her way out under the door, since it would swing outwardly under her pressure and allow her to pass out. A door latch 38 is pivoted at the point 39 at the end of a bracket 40 depending from the top of the box 24, immediately back of the door 32. This latch has a weighted shank 41 which depends well down into the path of a hen entering through the door-way 31, and is provided with a lip 42 immediately below the pivotal point 39, which is adapted to automatically swing over the edge 36 of the door 32 when the latter is raised into a horizontal position in a manner to be later described. Thus this latch by virtue of gravity acting upon the weighted shank 41, automatically engages the door 32 as it is raised horizontally, and so holds it until a hen in the act of passing into the nest 29 under the shank 41, pushes that shank backwardly and so releases the latch and causes the door 32 to fall down over the door-way 31, thus preventing other hens from entering the nest while it is occupied, although the hen inside is not only permitted but is compelled in a manner later described to pass out through the door-way 31 in case she fails to lay an egg. The outer sliding door 33, is mounted in guide ways 42 arranged at the front corners of the box 24 and in which guide ways the door 33 slides up and down across the door-way 31 which it is adapted to entirely close and so prevent a hen inside the box from escaping. The weight of the door would normally serve to close it. The lower edge of the inner door 32 is bent or curved outwardly as shown at 43, and curved, spring fingers 44 are mounted at the lower corners of the outer door 33 in such manner that when the door 32 is hanging down over the door-way 31, and the door 33 is closed downwardly, these fingers 44 will pass over the lower edge of the door 32 and spring back of that door. Then as the outer door 33 is again raised, the fingers 44 will pass up along back of the said edges of the door 32 and thereby raise that door again to a horizontal position, whereupon the latch 38 will engage the edge 36 of the door and hold it in horizontal position, in manner before described. The lifting action of the fingers 44 upon the door 32 is due to the fact that they operate in a plane in front of the rod 34 upon which the door 32 turns. After the door 32 is raised, the door 33 passes on higher, in manner to be explained, thus dragging the fingers 44 up across the edges of the door 32 and releasing them for a repetition of the same operation described.

The back of the box 24 is also left open and is provided with a sliding back door 45 mounted in guide-ways 46. This door is similar to the front sliding door 33, except that it is not provided with the fingers 44 of the front door. It is, however, pierced centrally of its lower edge with a latch slot 47. An angular latch lever 48 is provided, the same having a goose-neck bend 49 at one end, whereby it is pivoted by means of a pin 50 to a bracket 51 mounted below the floor 25, and having the other end also bent as shown at 52, in the same direction and in the same plane as the bend 49. The extremity of the bend 49 is notched outwardly to form a latch lip 53, and this extremity is passed up through an aperture 54 cut in the floor 25, and then the lip 53 is nicely adapted and adjusted to lockingly engage the latch slot 47 when the front end 52 of the lever 48 is elevated. A guide bracket 55 depends from the floor 25 immediately back of the egg port 26 and has a slot 56 through which the lever 48 passes. A spring 57 extended between the floor 25 and the lever 48 normally holds the lever in its elevated position, with the latch 53 thrust outwardly and ready to engage and hold the door 45 closed, when that door is lowered. The end 52 of the lever 48 is disposed between the chutes 27 and 21 and an egg tray 58 is mounted at the extremity of this lever in such position that an egg falling through the port 26 upon the chute 27 will roll from the chute 27 upon the tray 58, and thence onto the chute 21. The adjustment should be such that the weight of an egg upon the tray 58 in passing from the chute 27 to the chute 21, will overcome the strength of the spring 57 and depress the lever 48, thereby releasing the latch 53 and unlocking the door 45. The doors 33 and 45 are designed to work in opposition, with the door 33 open when the door 45 is closed, and vice versa. This is accomplished by means of an oscillating lever 60 pivoted at 61 medially to the top of a bracket 62 secured to the top of the box 24. Strong cords 63 connect the ends of this lever 60 with the top edges of the doors 33 and 45, these cords being of such length that one door is caused to open as the other is closed, as stated. However, the doors are not exactly balanced against one another, but the front door 33 is given the advantage over the back door 45 and is counterbalanced in such a way, either by sheer weight or by a greater length of the lever 60, as to normally fall to a closed position, while at the same time of course the door 45 rises and is held open. The rear door 45 opens into a sort of an exit cage 64 which is connected to the back of the boxes 22 and 24. An elevated door-way 65 affords an exit rearwardly through this cage, and this doorway is partly closed by a swinging rear door 66 which is hinged at 67 by its upper edge to the top of the door-way, and is adapted to swing outwardly and in closing to fall down against the corner posts 68. Thus a hen may make exit under this door but may not re-enter the cage through the door. A hinged door controlling platform 69 is mounted in the bottom of the cage 64, being hinged at 70 to the lower sill 71 of the door way 65, while the forward portion of the platform is left free to oscillate up and down in the base of the cage 64. Strong cords 72 connect the forward corners of this platform with the lower corners of the sliding rear door 45. The weighting or counterbalancing of the door 33 against the door 45 is to be sufficient to include the weight of the platform 69 and so as to normally elevate the front end of that platform to an approximate level with the sill of the door 45, but this counterpoise arrangement is also so nicely adjusted that the weight of a hen emerging from the nest box 24 onto the platform 69, will serve to depress the platform and pull the door 45 to its closed and latched position, and at the same time to raise the doors 33 and 32.

Immediately back of and annexed to the exit cage 64 is a hen trap 73, which is in its elements and function, almost an exact duplication of the egg trap 1 already described, except that the box 74 is much larger than the box 2 and stands horizontally, and the hen trap boards pivoted therein as shown at 75, 76, 77, and 78, are also much larger than the egg trap boards 6, 7, 8, and 9, to enable the hen trap to fulfill its purpose, to-wit: the entrapping of the hens 80, 81, 82, etc. as they emerge through the exit cage 64. This hen trap is also screened over with screening or wire netting 85, at its sides and outer end, and exit ports 86 provided with sliding covers 87, are cut in the base of one side of the hen trap, corresponding to the hen trap compartments 88, 89, 90, 91, 92, formed by the several traps boards 75, 76, etc. as the latter are upturned to their vertical positions by hens walking over them. A walking board 93 leads from the ground up to the front doors 32—33.

The operation of the trap nest is as follows:

The front doors 32—33 normally stand open, with the inner door 32 held in horizontal position by the latch 38. The first hen, as 80, walks into the nest box 24 through the open doors 32—33, and in this act presses under and releases the latch 38 in manner already described. She takes the nest 29 and if she lays an egg 15, it rolls down into the egg trap 1, in manner already stated, and rolls down the egg trap boards 6, 7, 8, and 9, upturning the last board 9 and falling to the bottom of the box where it is held. The egg in rolling over the egg tray 58, releases the latch 53, whereupon the front door 33 closes, and the rear door 45 opens, in manner already set forth. The only exit for the hen, therefore, is out into the hen trap 73, and she walks over the boards 75—78 until she reaches the last board 78 and steps upon the rear or free end thereof. This board immediately upturns and entraps her back of it as shown at 80 in the same way that the egg is held, and she cannot escape until released by the keeper. This hen in walking over the platform 69 reopens the front doors 32—33 and closes the rear door 45, as stated. Thus other hens enter the trap nest in succession and lay their eggs, which are trapped as shown at 16 and 17, while the hens are also trapped, as shown at 81 and 82. Should any hen fail to lay an egg the rear door 45 remains closed and the front doors 32 and 33 remain open, and her only exit from the box 24, therefore, lies through the front doors, as she came in. Thus the keeper is afforded a novel means of checking laying hens against non-laying ones, and can also ascertain by which hen each egg is laid. After making his check-up, as often during the day as he may desire, the trapped hens are released through the doors 86 by sliding the covers 87.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. A device of the kind described, comprising a lower egg trap box and an upper nest box, the two being connected by an egg port through the floor of the nest box; an outwardly swinging door for the front entrance of the nest box; a sliding door for the said front entrance, the same being set in front of the swinging door and spaced therefrom; a latch mechanism for releasably holding the swinging door in an horizontal open position, the said latch having a shank extended into the pathway from the doors to the interior of the box; means for automatically elevating the swinging door to its horizontal open position as the sliding door is raised; a sliding door for the rear opening of the nest box; an oscillating lever on top of the nest box and having its ends connected respectively to the front and rear sliding doors so that one will stand open while the other is closed, the front sliding door being arranged to overbalance the rear sliding door so as to stand normally closed when the rear door is open; an exit cage attached at the rear of the nest box and into which the rear sliding door opens; an outwardly swinging rear door for the exit cage; a door controlling platform mounted in the bottom of the exit cage and hinged to the sill of the swinging rear door and having its free forward end connected to the rear sliding door of the nest box; a nest arranged in the nest box and communicating through its bottom with the said egg port; a primary egg chute mounted below the egg port of the nest box; a latch lever pivoted within the egg trap box and having at one end a latch for releasably holding the rear sliding door in closed position, the opposite end being disposed below the mouth of the primary egg chute; means for normally holding the forward end of the latch lever in elevated position with the latch at the rear end in engagement with the rear sliding door; an egg tray mounted on the end of the said lever under the said egg chute; an egg trap loosely mounted within the egg trap box under the said egg tray, the said egg trap including an elongated box set on an incline and having a plurality of beveled and overlapping egg trap boards pivotally mounted therein from end to end, in such manner that an egg will roll from the upper end to a lower point and then automatically upturn the available rearmost board, and a secondary egg chute mounted on the egg trap and adapted to be disposed under the egg tray of the latch lever; a hen trap at the rear of the exit cage and into which the latter opens through its said swinging door, the said hen trap being enclosed with netting at its sides and end and having sliding exit doors for the several compartments, the said compartments being formed of beveled trap boards similar in shape and design to the egg trap boards but much larger in size, the same being pivoted within an elongated box.

2. A device of the kind described, comprising an egg trap box; an egg trap therein adapted to trap eggs in series, one at a time as they are delivered to it; a nest box mounted over the egg trap box and communicating therewith through an egg port; an exit cage at the back of the nest box; outwardly swinging doors for the nest box and exit cage; sliding doors for the front and back ends of the nest box, the same being so connected and counterbalanced that the front door will normally stand closed and the rear door open; means interplaying between the front swinging and sliding doors for automatically raising the former to a horizontal open position as the latter is elevated; a latch for automatically engaging and holding the front swinging door in its open position, said latch having a releasing shank extended into the doorway; a latch for the rear sliding door; a door controlling platform hinged in the exit cage and connected to the rear sliding door, and adapted, through the exit of one hen over the platform, to reset the front and rear doors for the entrance of another hen into the trap nest; a hen trap at the back of the exit cage, the same being adapted to trap hens in series as they emerge from the exit cage, a latch lever pivotally mounted within the egg trap box and having its rear end formed into a latch lip for releasably engaging the latch of the rear sliding door; an egg tray on the forward end of the latch lever, disposed over the said egg trap and adapted to receive the eggs one at a time through the egg port and deliver them to the egg trap, the said latch lever being adapted, through the passing of an egg over the egg tray, to unlatch the rear sliding door.

3. In a device of the kind described, the combination of a swinging and a sliding entrance door for hens, the sliding door having spring fingers at its lower corners adapted to pass back of the swinging door as the sliding door is closed, and to elevate the swinging door as the sliding door is raised, and to automatically release said spring fingers from engagement with the swinging door when the latter is completely elevated.

4. In a device of the kind described, the combination of a swinging and a sliding entrance door for hens, the sliding door having spring fingers at its lower corners adapted to pass back of the swinging door as the sliding door is closed, and to elevate the swinging door as the sliding door is raised, and to automatically release said spring fingers from engagement with the swinging door when the latter is completely elevated; a latch for automatically engaging and holding the swinging door in raised position, the said latch having a releasing shank extended into the door-way.

In testimony whereof I affix my signature.

WILLIAM R. LUTZ.

Witnesses:
HENRY BREMER,
FRANK H. MORRISON.